United States Patent Office 3,369,058
Patented Feb. 13, 1968

3,369,058
POLYMERIZABLE ETHYLENICALLY UNSATURATED CARBOXYLIC ACID ESTERS OF DIPHENYL OXIDES AND POLYMERS CONTAINING THE SAME
Patrick J. Keenan, Princeton, N.J., assignor to H. H. Robertson Company, Pittsburgh, Pa., a corporation of Pennsylvania
No Drawing. Filed Dec. 17, 1965, Ser. No. 514,717
6 Claims. (Cl. 260—872)

ABSTRACT OF THE DISCLOSURE

This invention relates to ethylenically unsaturated carboxylic acid esters having the formula

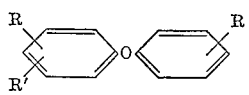

wherein R is

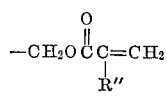

and R' is either —H or R with R'' being either —H or —CH$_3$. The invention is also concerned with polymerizable compositions containing this material and with polymers and copolymers of the material.

UTILITY

The present compositions are useful as polymerizable monomeric materials which can be cured to form molded articles and cast articles such as building panels, shaped automobile parts, and the like.

PREPARATION

The present polymerizable esters can be prepared by combining stoichiometric equivalents of acrylic acid or methacrylic acid or a mixture thereof with one mol of dihalomethyl-diphenyl ether or trihalomethyl diphenyl ether mixtures thereof in a suitable medium containing an acceptor for hydrogen halide. Triethylamine is a suitable acceptor. A small quantity of sodium iodide, 0.01–1.0% by weight of the reactants, may facilitate the reaction.

Example I

Methacrylic acid (2 mols, 172 grams), triethylamine (2 mols, 202 grams), and 4,4'-chloromethyldiphenyl ether (1 mol, 267 grams) was mixed in 200 grams of acetone and gently warmed. The reaction temperature was maintained below 70° C. A cloudiness in the reaction vessel indicated salt formation, specifically triethylamine hydrochloride, which is insoluble in the acetone. 100 parts per million hydroquinone was added to the reaction vessel during the cooking of the reactants to minimize premature gelation. After about 1.5 hours' reaction time, the salt was removed by filtration and the filter cake was washed with acetone. The acetone washings were returned to the reaction vessel. By vacuum techniques the acetone was evaporated from the filtrate and washings and the residual product was refiltered to remove any remaining traces of the triethylamine hydrochloride salt. The product was a clear, free flowing liquid with a viscosity of about 350 cps. at 85° C. The product yield was 97% of theoretical value.

A sample of the product was mixed with 1% by weight tertiary butyl peroxide as a polymerization initiator. The initiated material was maintained in an oven at 125° C. over a weekend. The product cured to a hard, solid substance having a heat distortion point of 145° C.

Example II

The starting material for the preparation of the present polymerizable material was a mixture having the following formula:

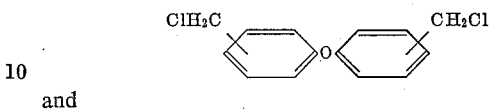

and

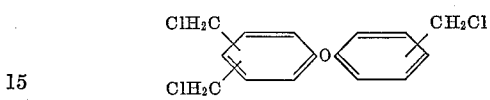

The chlorine content was 25–26 weight percent. The molecular weight was 267. The functionality was 2.09, i.e., each 267 weight units contained 2.09 —CH$_2$Cl groups.

267 grams of this material were mixed with 2.09×86 grams methacrylic acid and 2.09×101 grams triethylamine. The reactants were heated in an acetone solvent as described in the previous example and a clear monomer was obtained in a yield weich was 95% of theoretical. The added inhibitor was phenidone, 200 parts per million. The maximum reaction temperature was 54° C. Seven parts by weight of the material was mixed with three parts by weight sytrene to form a copolymerizable composition containing 30% styrene.

Example III

The starting material was a mixture of the materials shown in Example II. The instant material had a chlorine content of 31–32%, a molecular weight of 315 and an average functionality of 2.88, indicating that the material was a mixture of trichloromethyl, dichloromethyl and possibly monochloromethyl diphenyl oxide. 315 grams of the chloromethyl material was mixed with 2.88×86 grams methacrylic acid and 2.88×101 grams triethylene. 200 parts by weight triphenyl stibine were added as a polymerization inhibitor. The reactants were heated in 30% by weight acetone at a maximum reaction temperature of 62° C. Following recovery of the product polymethacrylate, an equal weight of the styrene was added to the material to prepare a copolymerizable composition having 50 weight percent styrene.

RESULTS

The 30% styrene syrup of Example II and the 50% styrene syrup of Example III were formed into clear castings by adding 0.5% by weight benzoyl peroxide, 0.5% by weight DDM and 0.025% by weight cobalt naphthanate. The initiated materials were cured at 100° C. in an oven for one hour and thereafter for one hour at 120° C. and two hours at 150° C. The clear castings had the following properties:

| | Example II | Example III |
|---|---|---|
| Percent styrene | 30 | 50 |
| Barcol hardness | 36 | 45 |
| Flexural strength, p.s.i. | 19,018 | 20,075 |
| Flexural modulus ×10$^6$ | 0.515 | 0.557 |
| Tensile strength, p.s.i. | 7,444 | 6,575 |
| Tensile modulus ×10$^6$ | 0.231 | 0.223 |
| Heat distortion, ° C. | 110 | 140 |
| Tensile elongation, percent | 4.4 | 3.3 |

The materials of this invention are useful as homopolymerizable resinous materials which can be cured upon the addition of suitable free radical initiators. These materials are also useful in copolymerizable compositions containing monomers having terminal >C=CH$_2$ radicals such as styrene, divinyl benzene, acrylic acid, methacrylic acid, methylmethacrylate, ethylmethacrylate, methylacrylate, ethylacrylate, diallyl phthalate, and the like. These materials also are useful as a copolymerizable cross-linking material for use in alpha, beta-ethylenically unsaturated polyester resins of the type containing polyesterification residues of alpha, beta-ethlylenically unsaturated dicarboxylic acids, or acid anhydrides such as maleic acid, maleic anhydride, fumaric acid, and the like. When utilized in whole or in part as a cross-linking monomer for such ethylenically unsaturated polyester resins, the present substances accommodate the addition of great quantitites of filling solid particles in the polymerizable resin composition, such as ground chalk, silica, fibrous fillers, wood flour, clays, and the like.

I claim:

1. A polymerizable material having the formula

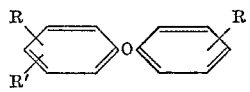

wherein R is

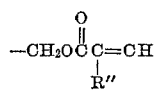

and R' is either —H or —R with R" being either —H or —CH$_3$.

2. A homopolymer of the material of claim 1.

3. A copolymer of the material of claim 1 and alpha, beta ethylenically unsaturated polyester resin.

4. A copolymer material of claim 1 and a copolymerizable monomer having a terminal >C=CH$_2$ radical.

5. A copolymerizable resinous composition containing the material of claim 1 and a copolymerizable monomer having a terminal >C=CH$_2$ radical.

6. A copolymerizable resinous composition containing the material of claim 1 and alha, beta ethylenically unsaturated polyester resin.

References Cited

UNITED STATES PATENTS

| | | | |
|---|---|---|---|
| 2,855,434 | 10/1958 | Fekete | 260—486 |
| 3,162,676 | 12/1964 | Goldberg et al. | 260—486 |
| 3,328,455 | 6/1967 | Schmukler | 260—47 |
| 3,285,997 | 11/1966 | Rubens | 260—47 |

MURRAY TILLMAN, *Primary Examiner.*

J. T. GOOLKASIAN, *Assistant Examiner.*